United States Patent [19]
Barefoot et al.

[11] Patent Number: 5,738,386
[45] Date of Patent: Apr. 14, 1998

[54] LIGHTWEIGHT PIPE CLAMP

[75] Inventors: Roy Stephen Barefoot, Hayes; Robert Myles, Port Haywood; Rodger L. Willett, Gloucester, all of Va.

[73] Assignee: Newport News Shipbuilding and Dry Dock Co., Newport News, Va.

[21] Appl. No.: 608,588

[22] Filed: Feb. 28, 1996

[51] Int. Cl.$^6$ .......................... B23K 37/053; B23K 37/04; F16L 13/013

[52] U.S. Cl. .................. 285/284.1; 228/44.5; 285/288.1; 285/23

[58] Field of Search ................. 228/44.3, 44.5; 285/121, 286, 420, 23, 284.1, 288.1

[56] References Cited

U.S. PATENT DOCUMENTS

| | | | |
|---|---|---|---|
| 2,800,867 | 7/1957 | Smith | 113/102 |
| 3,400,872 | 9/1968 | Rogers | 228/44.5 |
| 3,422,519 | 1/1969 | Fehlman | 228/44.5 |
| 3,705,453 | 12/1972 | Olson | 228/44.5 |
| 3,828,413 | 8/1974 | Province et al. | 29/200 P |
| 4,016,637 | 4/1977 | Swensen | 228/44.5 |
| 4,153,194 | 5/1979 | Leonard, Jr. | 228/44.5 |
| 4,356,615 | 11/1982 | Dearman | 29/525 |
| 4,385,514 | 5/1983 | Sassak | 72/416 |
| 4,666,138 | 5/1987 | Dearman | 269/43 |
| 4,750,662 | 6/1988 | Kagimoto | 228/44.5 |
| 5,052,608 | 10/1991 | McClure | 228/44.5 |
| 5,118,024 | 6/1992 | McClure | 228/44.5 |

FOREIGN PATENT DOCUMENTS

| | | | |
|---|---|---|---|
| 350319 | 1/1990 | European Pat. Off. | 228/44.5 |
| 66998 | 4/1984 | Japan | 228/44.5 |
| 68196 | 4/1985 | Japan | 228/44.5 |
| 5-192793 | 8/1993 | Japan | 228/44.5 |
| 230617 | 5/1969 | U.S.S.R. | 228/44.5 |
| 487738 | 1/1976 | U.S.S.R. | 228/44.5 |
| 2146280 | 4/1985 | United Kingdom | 228/44.5 |

*Primary Examiner*—Eric K. Nicholson
*Attorney, Agent, or Firm*—C. N. Rosen; L. A. Ormon

[57] ABSTRACT

A lightweight, portable clamping device assists in holding and reforming pipes in piping systems. The clamping device comprises a pair of semicircular clamp halves which are placed on the abutting ends of out-of-round pipe. The clamp halves are drawn together by tightening bolts on either side to align and reform the ends of abutting pipes. The clamping device can also be used to shape and hold the end of a single piece of pipe. A plurality of access ports around the perimeter of the device allow a welder to tack weld the ends of abutting pipes prior to welding.

6 Claims, 6 Drawing Sheets

LIGHTWEIGHT PIPE CLAMP

BACKGROUND OF THE INVENTION

This invention relates generally to mating and aligning thin walled piping, and more particularly to a portable pipe clamp for assisting in reforming the ends of pipes, and aligning and tack welding abutting pipes prior to final welding. This invention is especially useful where out-of-round pipe must be butt welded. It gives the user the ability to quickly and accurately reshape out-of-round pipe and hold it in place during tack welding to prevent offset of the welded joint. Offset results when base materials creating a butt joint move out of alignment, and is one of the major causes of in-service failures.

The portability of this invention makes for improved quality in the field during initial fit-up, thereby reducing the rate of failure and subsequently the amount of rework due to joints that do not pass inspection. By reducing the amount of rework, this invention provides a significant reduction in the overall cost of manufacturing piping systems.

SUMMARY OF THE INVENTION

The portable lightweight pipe clamp of the present invention eliminates much of the difficulty encountered by pipe fitters when trying to fit-up out-of-round pipe. For years pipe fitters have been frustrated with this problem which has been on the increase in recent years. Quality and cost control measures implemented by suppliers have allowed them to eliminate the extra wall thickness on pipes that was commonplace. Thinner walls mean less tolerance for pipe fitters, especially for butt-welded pipe. Thinner walls also mean more out-of-round pipe. Out-of-roundness may be caused by handling, storage, or even during welding when offset occurs. It is not uncommon for up to 80% of pipe received in the shop or at the construction site to be out-of-round.

Pipe fitters have resorted to numerous methods such as using c-clamps, undersized pipe hangers, or even mallets to reform pipe. Many of the pipe reforming devices found in the prior art are time-consuming and often very complicated. This invention eliminates the numerous adjusting screws, hydraulic pawls, and other complicated mechanisms found in the prior art by providing a simple, yet effective way of reforming pipe. The simplicity and efficiency of this invention will be more readily understood from a reading of the specification and drawings.

DETAILED DESCRIPTION

The lightweight pipe clamp is used in butt welding lengths of pipe together where the pipe may be out-of-round. That is, part of the diameter of the pipe may be greater than the nominal diameter (runout) while part of the diameter may be less than the nominal diameter (negative runout). If uncorrected this results in offset of the welded joint where base materials move out of alignment.

Figure 1:
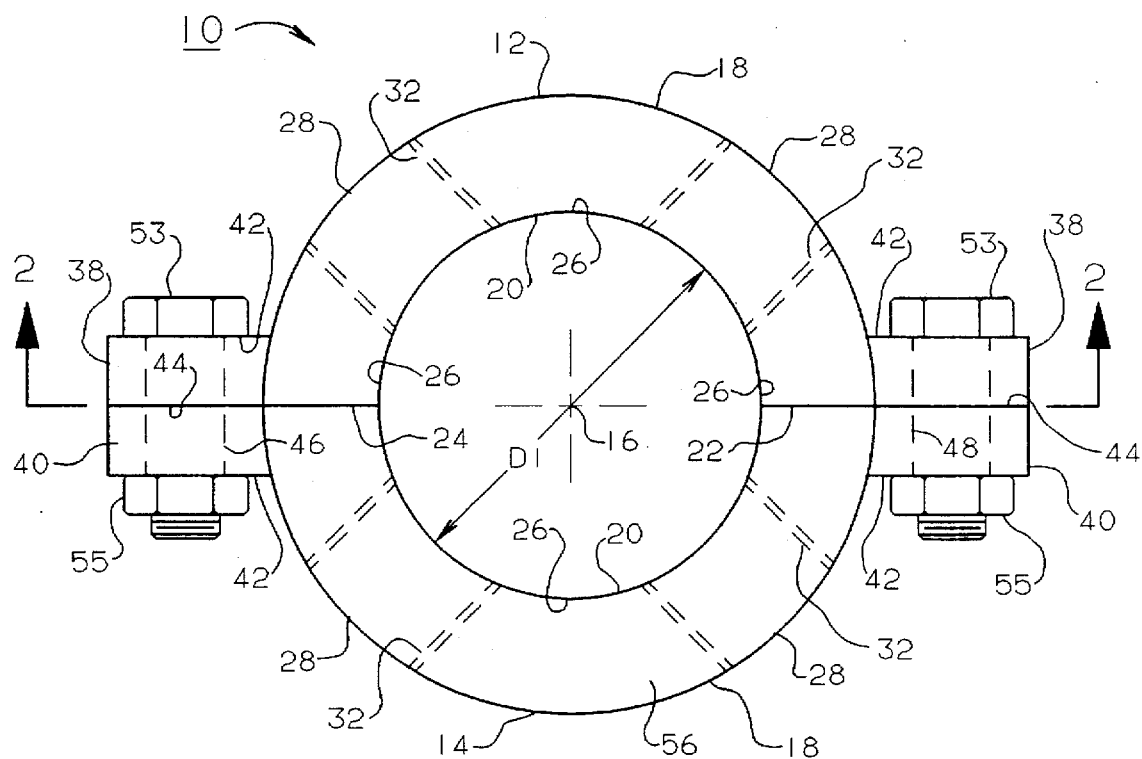
FIG. 1 is a plan view of the preferred embodiment of the present invention.

Referring to the drawings, and particularly FIG. 1, the lightweight pipe clamp of the present invention is generally indicated by numeral 10 and is shown in a free standing position. Pipe clamp 10 is generally round in cross-section and comprises a first half 12, a second half 14, and central axis 16. In the preferred embodiment, each half 12,14 is of generally semicircular cross-section having a curved outer surface 18, a curved inner surface 20, and a pair of mating end surfaces 22,24.

Figure 2:
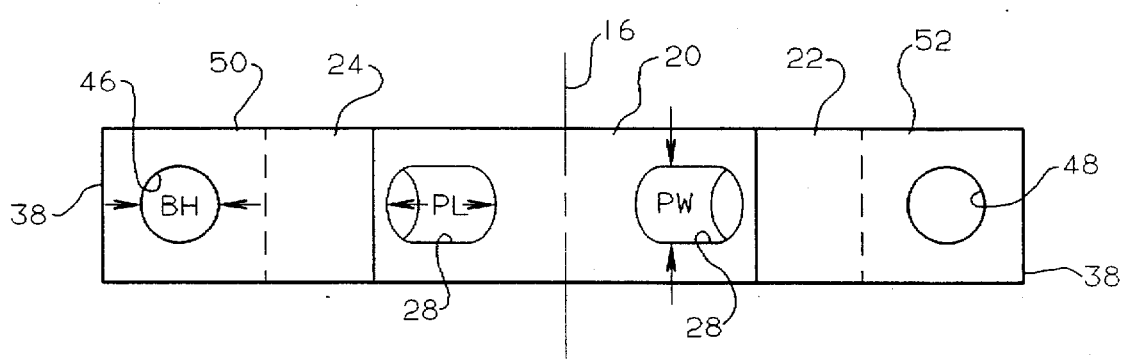
FIG. 2 is a view taken along line 2—2 of FIG. 1 showing the access ports and bolt holes without the bolts of one half of the embodiment of FIG. 1.
Figure 5:
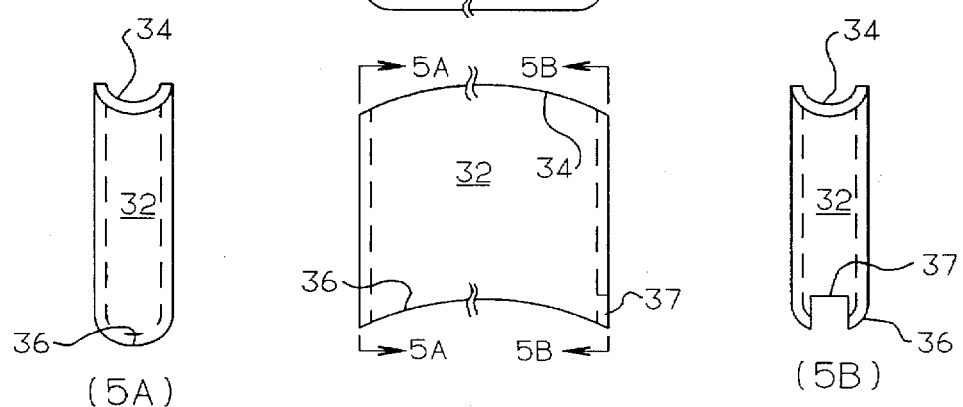
FIG. 5 shows top, front, and end views of the two configurations of a port insert.

Referring to FIGS. 1 and 2, inner surfaces 20 of clamp halves 12,14 form a substantially smooth continuous contact surface 26 when clamp halves 12,14 are mated. Each clamp half 12,14 further has a plurality of access ports 28 which provide access to the pipes' outer surfaces and ends for tack welding when clamp 10 is mounted on abutting pipes. Access ports 28 are defined by generally elongated openings between the outer surface 18 and the inner surface 20 of each clamp half 12,14. Access ports 28 are protected from weld flash by having port sleeves 32, shown in FIG. 5, 5A, and 5C. Port sleeves 32 have substantially the same shape as ports 28 including curved edges 34,36 to correspond with curved outer surface 18 and curved inner surface 20 of clamp halves 12,14, respectively. Port sleeves 32 are held in place by friction and are therefore removable. In the preferred embodiment, port sleeves 32 are configured as shown in FIGS. 5, 5A, and 5C. Port sleeves 32 are preferably made of a phenolic resin material which is heatproof and allows for easy removal of weld spatter.

Again referring to FIGS. 1 and 2, clamp halves 12,14 each further includes a pair of bolt ears 38,38 and 40,40 respectively, extending in opposite directions from end surfaces 22,24. Bolt ear pairs 38,38 and 40,40 provide a means of drawing clamp halves 12,14 together when clamp 10 is mounted on the ends of two mating pipes. Bolt ear pairs 38,38 and 40,40 are generally rectangular in shape in the preferred embodiment but may be of any shape. Bolt ear pairs 38,38 and 40,40 have outer surfaces 42, inner surfaces 44, and bolt holes 46,48. Inner surfaces 44 are in the same plane as end surfaces 22,24 which together form clamp engaging surfaces 50,52. Bolt and nut combinations 53,55 when inserted into bolt holes 46,48 complete the means of drawing clamp halves 12,14 together.

Figure 4:
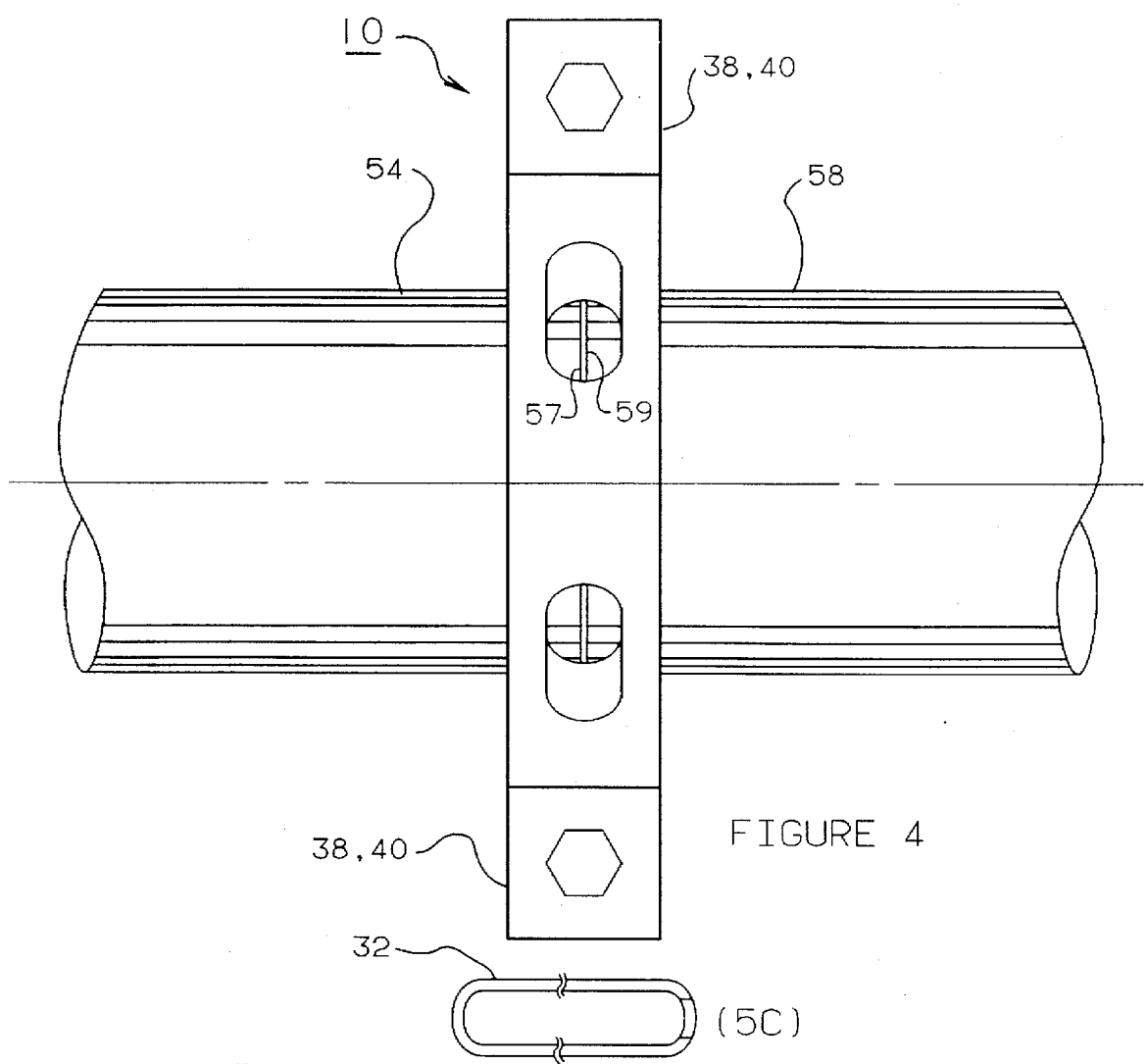
FIG. 4 is a side view of the preferred embodiment of the present invention mounted on the ends of two mating pipes which are to be welded together.

When clamping device 10 is circumferentially mounted on the ends of mating pipes 54,58 as in FIG. 4, inner surfaces 20 of clamp halves 12,14 combine to form substantially smooth continuous contact surface 26. As clamp halves 12,14 are drawn together by successively tightening bolt and nut combinations 53,55, contact surface 26 exerts a radially compressive force around the outer circumference of pipe ends 57,59. The substantially smooth continuous contact surface 26 distributes the radially compressive force such that the force is greatest where the runout is greatest and least where the runout is negative. This reforms the pipe ends to roundness and aligns them in preparation for welding. As the pipe ends 57,59 are reformed to round, contact surface 26 continuously redistributes the radially compressive force until it is equally distributed over the circumferences of the reformed pipes, at which point the pipes are no longer out-of-round. When clamp halves 12,14 are drawn together such that clamp engaging surfaces 50,52 of clamp half 12 are in contact with the clamp engaging surfaces 50,52 of clamp half 14, the inside diameter D1 of clamp 10 is substantially equal to the outside diameter of the reformed pipes 54,58. The weld joint thus formed may then be tack welded through access ports 28. Upon removal of clamp 10 the tack welds hold the pipes in place so that final welding may be completed.

Table 1 shows the typical dimensions of a clamp for pipe sizes 100, 125, and 150 mm nominal diameter. The inside diameter D1 of clamp 10 has a tolerance of +0,−.15 mm in the preferred embodiment for best results. The material and other dimensions of the clamp are such as to provide compressive force on the pipe sufficient to reform it into roundness.

TABLE 1

| DIMENSION | NOMINAL PIPE SIZE | | |
| --- | --- | --- | --- |
| | 100 MM | 125 MM | 150 MM |
| D1 | 114.3 | 141.3 | 168.3 |
| PW | 20 | 20 | 20 |
| PL | 50 | 50 | 50 |
| BH | 14.3 | 14.3 | 14.3 |

Figure 3:
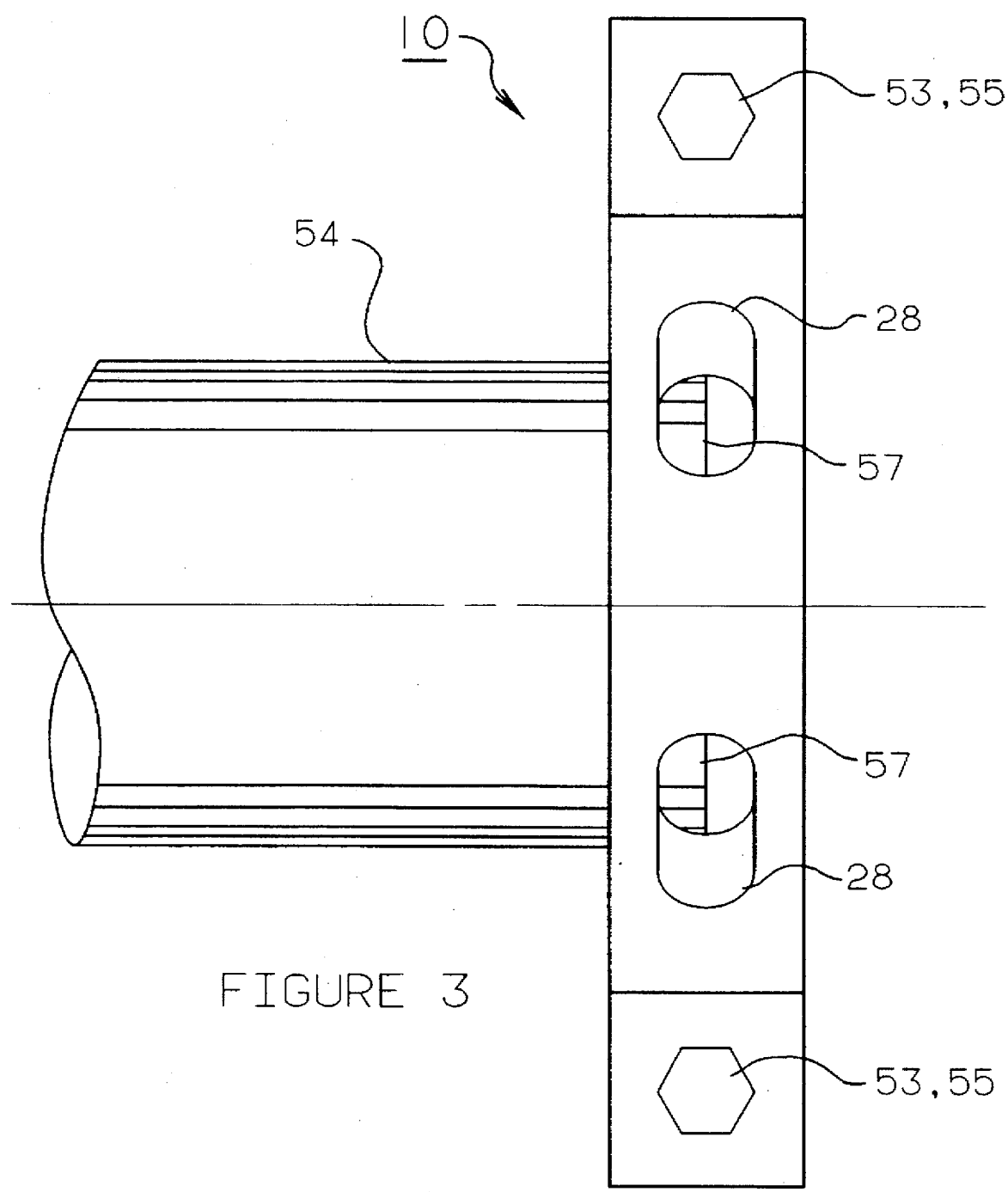
FIG. 3 is a side view of the preferred embodiment of the present invention mounted on the end of a pipe.

(All dimensions in millimeters)

where,

D1=inside diameter of clamping device
PW=width of access ports
PL=length of access ports
BH=diameter of bolt holes As shown in FIG. 3, clamping device 10 can be used to reform the end of a single out-of-round pipe. Clamping device 10 is mounted on the end of pipe 54. As bolt ears 38,38 of clamp half 12 are drawn toward bolt ears 40,40 of clamp half 14, contact surface 26 compressively engages the end of pipe 54 reforming any out-of-roundness. Pipe 54 may subsequently be aligned and held in abutment with the end of another pipe.

Figure 6:
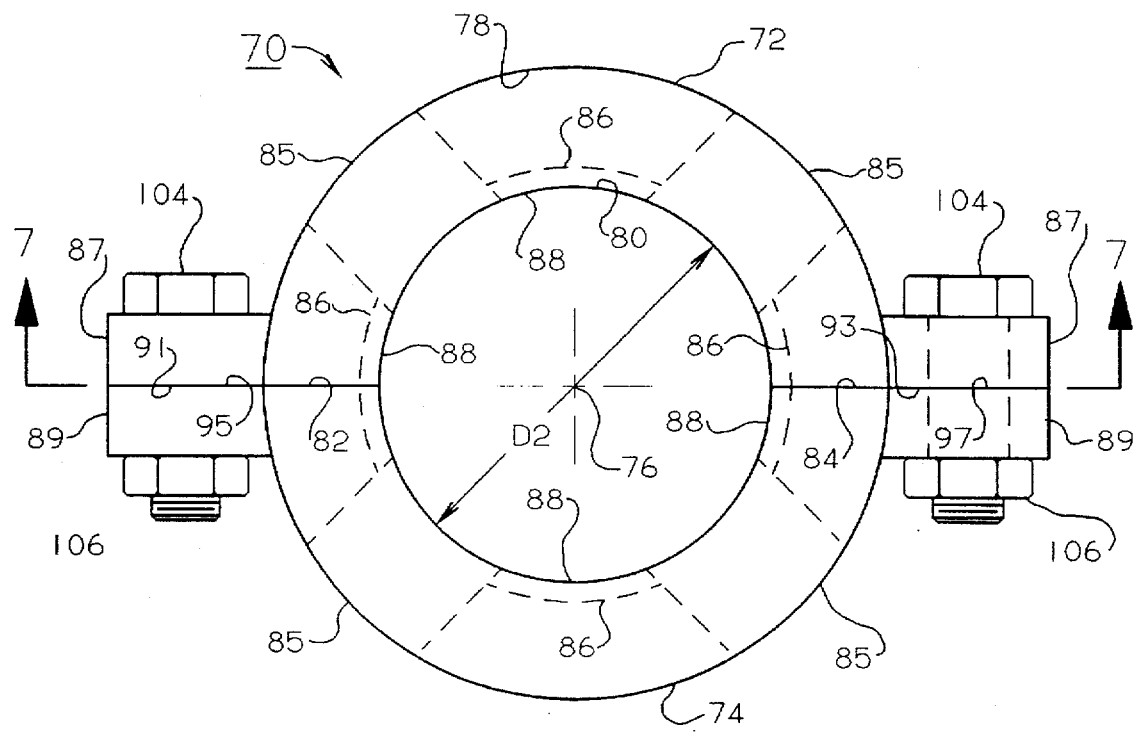
FIG. 6 is an alternate embodiment of the present invention showing the addition of a channel in the contact face of the clamp.
Figure 7:
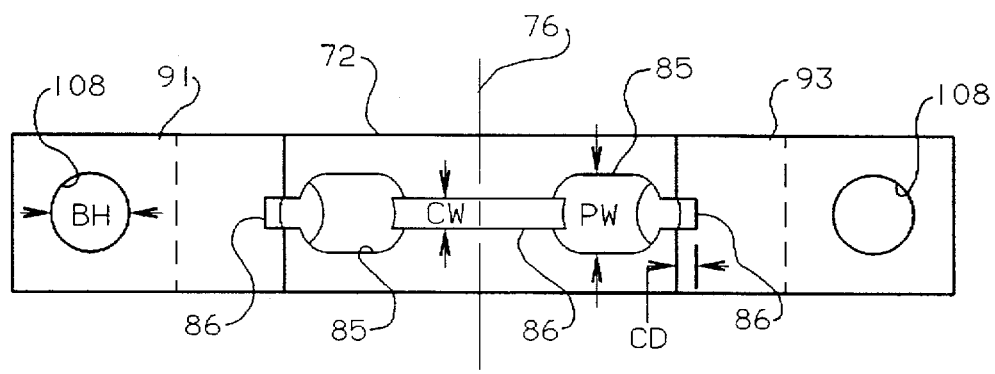
FIG. 7 is a view taken along line 7—7 of FIG. 6 showing one half of the embodiment of FIG. 6.
Figure 8:
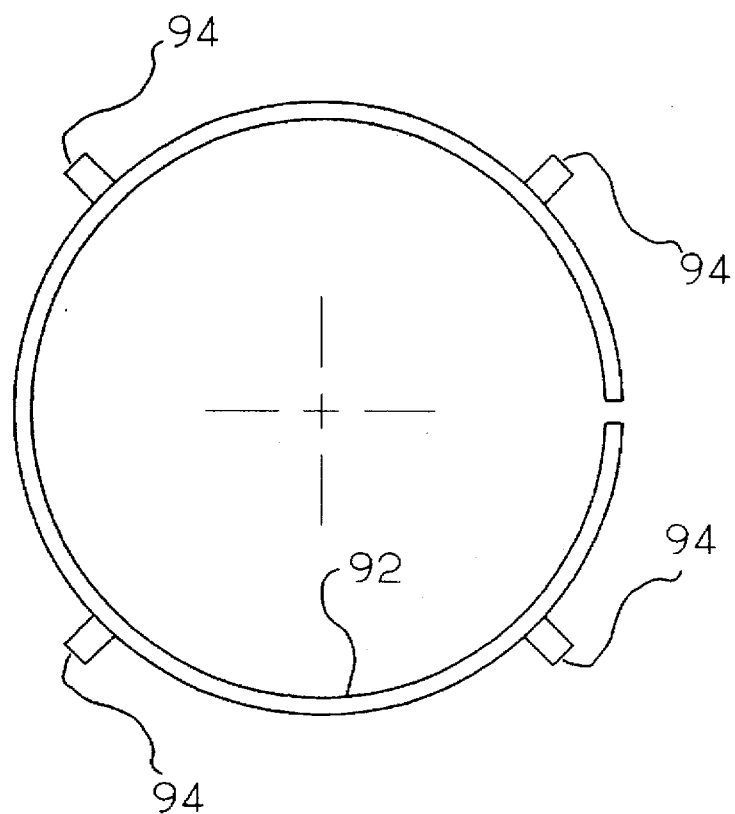
FIG. 8 is a plan view of a typical backing ring used with the embodiment of FIG. 6.

An alternate embodiment of the present invention generally indicated by numeral 70 is shown in FIGS. 6, 7, and 8. Clamping device 70 is generally round in cross section, and comprises first half 72, second half 74, and central axis 76. As shown in FIG. 7, each clamp half 72,74 is of generally semicircular shape having a curved outer surface 78, a curved inner surface 80, a pair of mating end surfaces 82,84, a plurality of access ports 85, and bolt ears 87,87.

Figure 9:
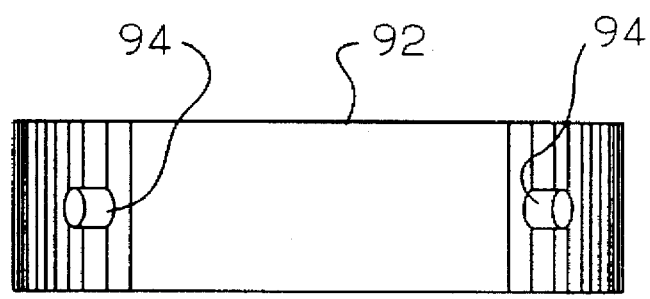
FIG. 9 is a top view of a the backing ring of FIG. 8 showing two of the backing ring tabs.

In addition to features substantially equal to those of clamp 10 shown in FIGS. 1-5, clamp 70 has a central channel 86 recessed in contact surface 88. Central channel 86 is of generally rectangular cross-section and extends around the entire contact surface 88. Clamp 70 is used for reforming and aligning abutting pipes which require the use of backing ring 90 shown in FIGS. 8, 9 and 10. Backing ring 90 serves to back up the weld joint between abutting pipes 96,98. The weld extends into backing ring 90 which is generally left in the joint after the weld is completed.

Figure 10:
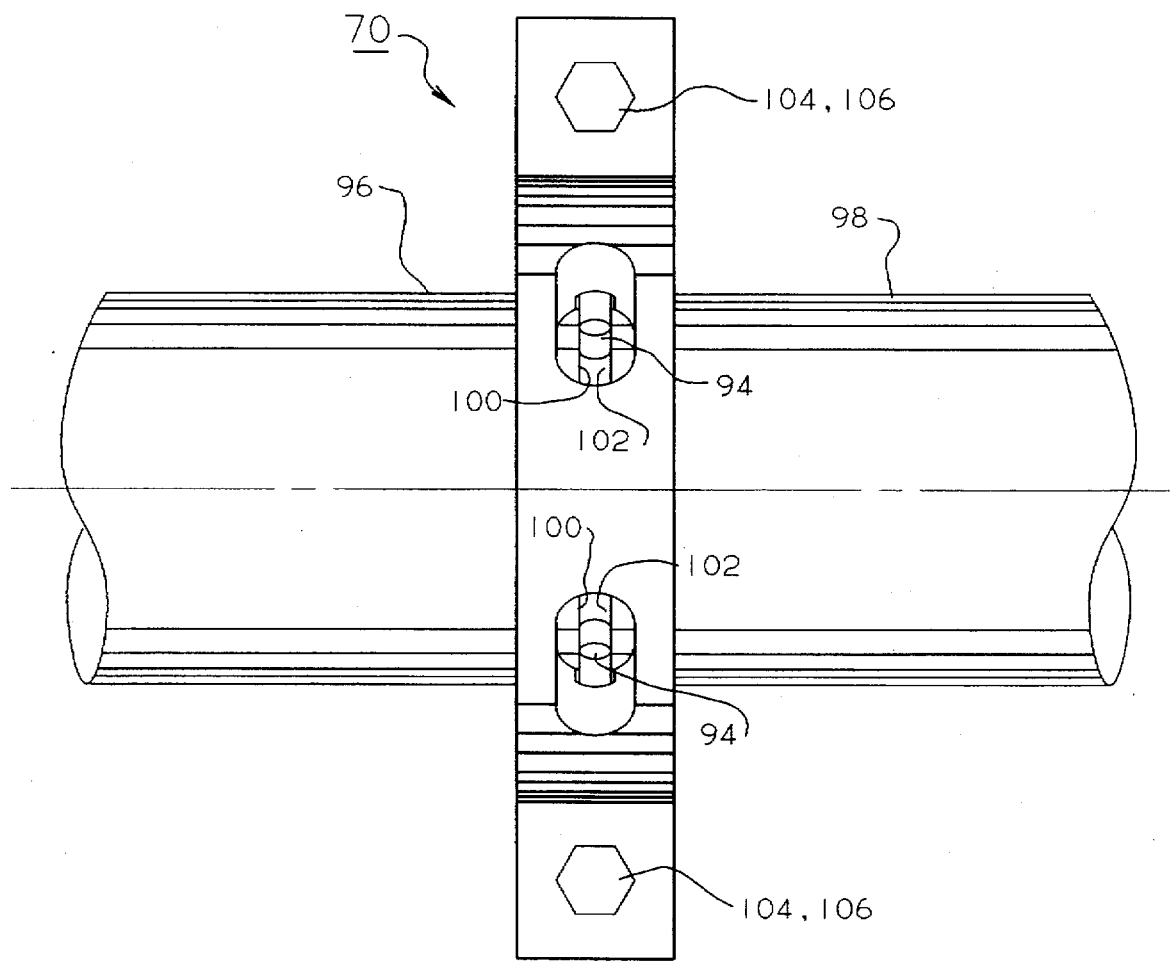
FIG. 10 is a side view of the embodiment of FIG. 6 mounted on the ends of two abutting pipes with backing ring in place.

Backing ring 90 is formed from flat stock 92 which is rolled into a circular configuration. A small gap is left in the circle to allow backing ring 90 to be slightly compressed for easy insertion into the end of a pipe. The natural springback of ring 90 holds it in place against the inside surface of the pipe. Backing ring 90 further includes a plurality of tabs 94 around its perimeter for adjusting backing ring 90 between abutting pipes 96,98 as shown in FIG. 10. Tabs 94 extend radially outward from backing ring 90 between abutting pipes 96,98 as shown in FIG. 10.

Channel 86 recessed in contact surface 88 of clamp 70 is of sufficient depth to clear tabs 94 of backing ring 90. Channel 86 is concentric with backing ring 90 when both are used to align abutting pipes 96,98. Backing ring 90 is inserted into the ends of abutting pipe 96,98 with tabs 94 extending between the ends 100,102 of abutting pipes 96,98. Tabs 94 also serve as spacers to maintain the proper gap for welding abutting pipes 96,98. Clamp 70 is then mounted circumferentially on the ends of abutting pipes 96,98 such that backing ring 90 is concentric with channel 86. Successively tightening bolt and nut combinations 104,106 draws the clamp halves 72,74 together reforming and aligning abutting pipes 96,98. Inside diameter D2 will then be substantially equal to the outside diameter of pipes 96,98. Pipes 96,98 are then tack welded through access ports 85 in preparation for final welding. If additional tack welds have to be made, access ports 85 can be repositioned by loosening bolt and nut combinations 104,106 disposed in bolt holes 108, rotating clamping device 70 around axis 76 to a new position without having to remove backing ring 90 or grind down tabs 94, then retightening bolt and nut combinations 104,106.

Port sleeves 32 for alternate embodiment 70 are shown in FIGS. 5, 5B, 5C, and 6. Port sleeves 32 have notch 37 cut in the lower edge 36 to conform to channel 86.

Table 2 shows the dimensions of a typical clamp of alternate embodiment 70 for pipe sizes 200, 250, and 300 mm nominal diameter. The inside diameter D2 has a preferred tolerance of +0,−.15 mm for best results.

TABLE 2

| DIMENSION | NOMINAL PIPE SIZE | | |
| --- | --- | --- | --- |
| | 200 MM | 250 MM | 300 MM |
| D2 | 219 | 273.1 | 323.9 |
| PW | 20 | 20 | 20 |
| PL | 80 | 80 | 80 |
| BH | 17.5 | 17.5 | 17.5 |
| CW | 10 | 10 | 10 |
| CD | 10 | 10 | 10 |

(All dimensions in millimeters)

where,

D2=inside diameter of clamping device
PW=width of access ports
PL=length of access ports
BH=diameter of bolt holes
CW=width of channel
CD=depth of channel The foregoing description of the invention should be limited only by the scope of the appended claims in which we claim:

What is claimed is:

1. A lightweight, portable clamping device circumferentially mountable on the ends of a pipe for reforming and aligning the outside diameter comprising:

a pair of semicircular clamp halves, each said clamp half having a substantially smooth inner surface, an outer surface, and a pair of end surfaces;

a plurality of access ports around the perimeter of each said clamp half for receiving a welding electrode, wherein said plurality of access ports consist of a plurality of elongated openings disposed between said inner surface and said outer surface of said clamp half, said elongated openings including port sleeves disposed therein, said sleeves having substantially the same shape as said openings and being in frictional engagement with said openings; and means for drawing one said clamp half toward said other clamp half to mate said respective pairs of end surfaces.

2. A clamping device as in claim 1, wherein said port sleeves are of a phenolic resin material.

3. A lightweight, portable clamping device circumferentially mountable on the ends of a pipe for reforming and aligning the outside diameter comprising:

a pair of semicircular clamp halves, each said clamp half having a substantially smooth inner surface, an outer surface, and a pair of end surfaces;

a plurality of access ports around the perimeter of each said clamp half for receiving a welding electrode;

means for drawing one said clamp half toward said other clamp half to mate said respective pairs of end surfaces; said pair of clamp halves being mounted in opposing relationship on said ends of abutting pipes, said halves further being mated by said drawing means, said mated halves having a substantially smooth continuous contact surface compressively engaging and aligning the outer surfaces of each said pipe end; said contact surface having a diameter substantially equal to the outside diameter of said pipe ends;

said smooth contact surface further distributing a radially compressive force around the circumference of said pipe ends;

said radially compressive force being initially greatest along said circumference where runout of said pipe ends is greatest and least along said circumference where runout of said pipe ends is negative, and later evenly distributed when said pipe ends are reformed to round; said clamping further including a backing ring inserted into said abutting ends of said pipes, said backing ring having a plurality of tabs extending radially outward from said ring; and said clamp halves each further comprises a channel disposed in said inner surface, said channel having sufficient depth to clear said tabs.

4. A method of holding and shaping the abutting ends of pipes prior to welding using a lightweight, portable clamping device comprising the steps of:

providing a pair of semicircular clamp halves, each said clamp half having a substantially smooth inner surface, an outer surface, and a pair of end surfaces;

providing a plurality of access ports around the perimeter of each said clamp half for receiving a welding electrode, which includes the step of locating a plurality of elongated openings between said inner surface and said outer surface around the perimeter of said clamp halves; inserting into each said elongated opening a port sleeve, said sleeve having substantially the same shape as said opening and frictionally engaging said opening;

positioning said clamp halves in opposing relationship on the abutting ends of said pipes; and providing a means for drawing one said clamp half toward said other clamp half to mate said respective pairs of end surfaces.

5. A method as in claim 4, including providing said port sleeves of a phenolic resin material.

6. A method of holding and shaping the abutting ends of pipes prior to welding using a lightweight, portable clamping device comprising the steps of:

providing a pair of semicircular clamp halves, each said clamp half having a substantially smooth inner surface, an outer surface, and a pair of end surfaces;

providing a plurality of access ports around the perimeter of each said clamp half for receiving a welding electrode;

positioning said clamp halves in opposing relationship on the abutting ends of said pipes;

providing a means for drawing one said clamp half toward said other clamp half to mate said respective pairs of end surfaces; wherein providing said drawing means includes the steps of:

providing a pair of bolt ears extending radially outward from said end surfaces of each said clamp half, said bolt ears each having an outer and an inner surface and bolt holes disposed therebetween, each said inner surface and each said respective end surface defining a clamp engaging surface;

providing bolting means disposed in said bolt holes;

operating said bolting means to move said clamp engaging surfaces of one said clamp half toward said clamp engaging surfaces of said other clamp half;

further including inserting a backing ring into said abutting ends of said pipes, said backing ring having a plurality of tabs extending radially outward from said ring between said abutting ends;

providing a channel disposed in said inner surface of each said clamp half, said channel extending entirely around said inner surface of said clamp half and having sufficient depth to clear said backing ring tab; and positioning said clamp on said pipe ends such that said channel is concentric with said backing ring.

* * * * *